July 4, 1961   R. P. GARRISON   2,991,084
WORK HOLDER
Filed Aug. 24, 1959

INVENTOR.
RALPH P. GARRISON
BY Tom Walker
ATTORNEY

2,991,084
WORK HOLDER
Ralph P. Garrison, Dayton, Ohio, assignor to Garrison Machine Works, Inc., Dayton, Ohio, a corporation of Ohio
Filed Aug. 24, 1959, Ser. No. 835,616
11 Claims. (Cl. 279—1)

This invention relates to a work holder and more particularly to a diaphragm type chuck device.

While prior art is replete with a variety of chuck devices, the great majority are designed for particular and limited application and are costly to fabricate. Those designed for general use have a tendency to be complex and not too adaptable. Cost has been a factor of considerable concern in any instance.

The present invention answers a definite need in the art. It provides a cheap and exceedingly simple chuck device which can easily adapt to a multitude of applications. Its component structure is so basic it leaves no room for malfunction and maintenance problems are substantially eliminated. Its operation requires no skill and a minimum of intelligence.

A primary object of the invention is to provide a chuck device which is cheap to fabricate, more efficient and satisfactory in use, adaptable to a wide variety of applications anu unlikely to malfunction.

Another object of the invention is to provide improved chuck apparatus the fabrication of which involves a minimum of material and labor.

A further object of the invention is to provide a cheap work holder which will positively function in a simple and effective manner.

Another object of the invention is to provide a novel diaphragm type chuck.

An additional object of the invention is to provide improved chuck apparatus of a diaphragm type including work retention means integrated to one face of a resilient diaphragm whereby a simple flexing of the diaphragm will cause the work retention means to fix a work piece thereto.

A further object of the invention is to provide chucking apparatus possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 1:
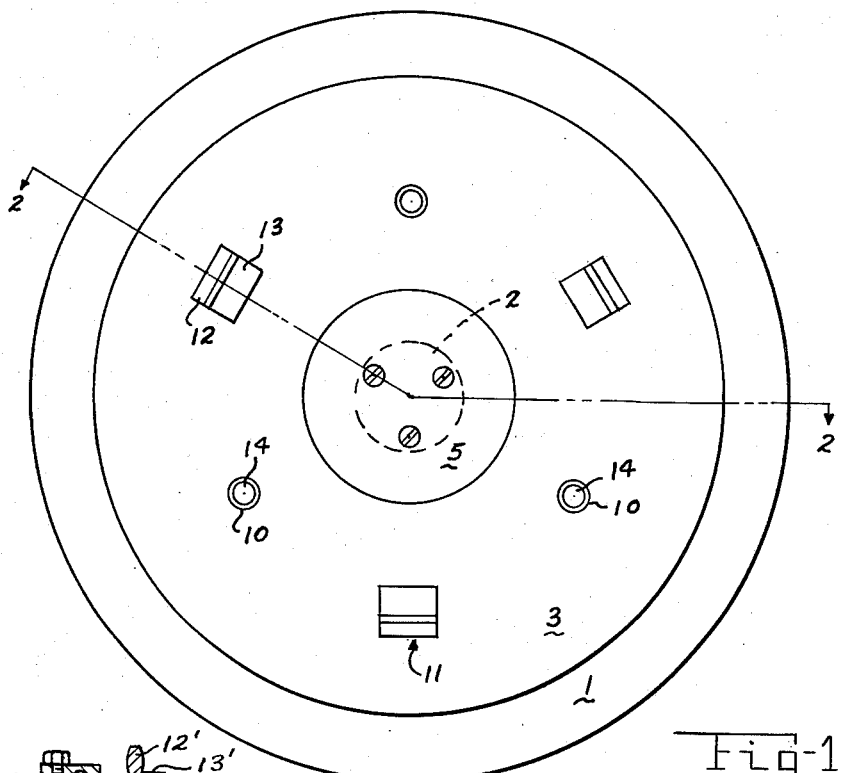
Figure 3:
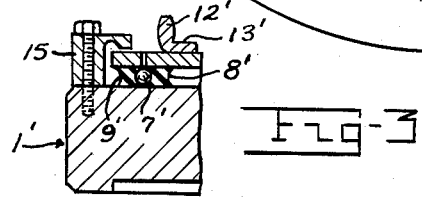
Figure 2:
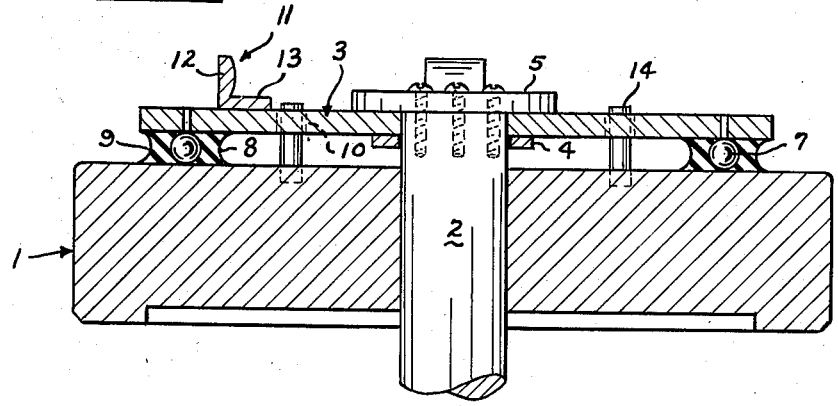

Referring to the accompanying drawings wherein is shown one but obviously not necessarily the only form of embodiment of the invention, FIG. 1 is a plan view of the face of a chuck device in accordance with the invention, FIG. 2 is a cross sectional view of a chucking unit incorporating the device of FIG. 1, taken along line 2—2 thereof, and FIG. 3 is a fragmentary sectional view of a modification of the chuck device of FIG. 1.

Like parts are indicated by similar characters of reference throughout the several views.

The invention can be best described with reference to the embodiment in the accompanying drawings which is adapted to be applied to the face plate of any machine tool.

A centrally apertured plate 1 is shown for mounting to the face plate of a machine tool to provide a bearing for a draw bar 2. The draw bar operatively connects to suitable controls provided in the tool whereby it may be reciprocated relative the plate 1. Details of the controls are not shown since they are not pertinent to the present invention.

The draw bar 2 projects relative the plate 1 to mount an annular diaphragm 3 of resilient flexible material about its projected extremity. The diaphragm, which is preferably of metal, abuts a shoulder 4 on the draw bar to establish its outer face substantially flush with the outer end of the draw bar. A plate 5 fixed over the end of the draw bar confines the inner peripheral portion of the diaphragm to the shoulder 4. The diaphragm is thus mounted to extend generally parallel to the outer face of the plate 1.

Three tool balls 7 are fixed by their pin portions in circularly spaced relation on the peripheral portion of the diaphragm 3 to have their spherical portions project to and bear on the outer face of the plate 1. A pair of annular gaskets 8 and 9 of resilient material seat between the diaphragm 3 and plate 1 to confine and form a seal about the projected spherical portions of the tool balls. The diaphragm 3 is also provided with three circularly arranged apertures 10 spaced radially inward of the balls 7.

Fixed to the outermost face of the diaphragm 3 in circularly spaced relation and uniformly displaced from apertures 10 are right angled lug elements 11. One leg 12 of each element 11 normally projects outwardly at right angles to the diaphragm, while the other leg 13 seats to the face of the diaphragm, directed radially inwardly to its center. The face of each leg 12 adjacent the inner portion of the diaphragm is arcuately formed and generally convex. The convex surfaces of the lugs 11 mutually cooperate to hold a work piece as will be described. Limit studs 14 fixed at right angles to the plate 1 project through the apertures 10 in the diaphragm 3 to limit movement of a work piece inwardly to the plate 1.

An illustrative embodiment of the invention is thus provided. In use a work piece is axially directed inwardly to the outer face of the diaphragm. The lugs 11 will be positioned to peripherally outline the work piece which seats to the diaphragm therebetween. The limit studs 14 insure the proper control of the inward movement of the work piece. As the work piece is seated, the draw bar is operated by conventional controls to retract inwardly of plate 1 to thereby retract the center of the diaphragm and produce a concavity in its outer face. The peripheral portions of the diaphragm have a uniform spacing from plate 1 maintained by the spherical portions of tool balls 7 which roll on the plate 1 as the center of the diaphragm is retracted. This provides relatively friction free adjustment of the diaphragm by the draw bar and insures the concavity induced therein will be uniform throughout. Fatigue of the diaphragm material as it is flexed and reflexed by the draw bar is thereby minimized. The drawing of the center of the diaphragm inwardly to plate 1 causes the projected portions 12 of lug elements 11 to automatically and mutually converge in precision fashion. The convex surfaces of elements 11 clamp the work piece in a gentle but firm fashion that produces no stress in or damage to the work piece. These same convex surfaces enable a definite smooth centering of the work piece.

As may be seen, the work piece is simply yet effectively clamped to the diaphragm with an absolute minimum of stress and strain either on the work piece, the chuck components, or the chuck operator. The device is cheap to fabricate and use and may be readily modified for external chucking applications in a manner believed obvious. Thus, chuck apparatus is provided which is capable not only of reducing chuck costs to a considerable degree but also of functioning in a trouble free efficient manner.

Reference is made to FIG. 3 of the drawings for a chuck device as in FIG. 1 modified and adapted for selective internal or external chucking. The structure of the device of FIG. 3 is identical in character to that of FIGS. 1 and 2 with the following exceptions. Here, the projected legs 12' of the lugs 11' have their faces, respectively, to the inner and outer portions of the diaphragm 3', both arcuately formed and generally convex. Also, brackets 15 are added which are fixed by screws to project from the outer face of plate 1' in circularly arranged relation, spaced slightly outward of the outer peripheral edge of the resilient diaphragm 3'.

Each of the brackets project beyond the outer face of the diaphragm. Their projecting extremities have right angled portions directly radially inward of and in overlapping slightly spaced relation to the outer peripheral edge of the diaphragm. These right angled portions of the brackets uniformly limit movement of the outer peripheral edge of the diaphragm outwardly of plate 1'. Each of these right angled portions also have an undercut in the path of movement of the periphery of the diaphragm whereby to accommodate its adjustment irrespective of whether the diaphragm is flexed inwardly or outwardly.

In using the modified version of the invention for internal chucking, the draw bar shown in FIG. 1 of the drawings is moved outwardly of plate 1' to produce a uniform central convexity in the outer face of the connected diaphragm 3'. This is insured by containment of the peripheral edge of the diaphragm by the brackets 15. In this instance the outer convex faces of the legs 12' of lugs 11' diverge to mutually cooperate to internally engage and hold a work piece in a precise damage free condition due to the smooth gentle centering enabled thereby as previously described. The nature and manner of application of the invention in this form is believed to be so obvious as to require no further detailed description.

From the above description it will be apparent that there is thus provided a device of the character described possessing the particular features of advantage before enumerated as desirable, but which obviously is susceptible of modification in its form, proportions, detail construction and arrangement of parts witout departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention ino effect, and the invention is therefore claimed in any of its forms or modifications within the legitimate and valid scope of the appended claims.

Having thus described my invention, I claim:

1. Work holder apparatus including a support, a diaphragm, means mounting said diaphragm in spaced adjacent relation to one face of said support, said means including means projecting from said one face of said support into limited supporting relation to the face of said diaphragm toward said support, said diaphragm having lugs on its face away from said support arranged to define a configuration of a work piece to be applied thereto, said lugs having a generally convex surface contour, and means bearing in said support operative to flex said diaphragm to cause said lugs to fixedly engage and smoothly center the work piece to said diaphragm.

2. A work holder including a support, a relatively resilient plate mounted adjacent to one face of and separate from said support, said support having means extending into limited contact with the face of said diaphragm toward said support, said diaphragm having means projecting from its face most remote from said support to define the periphery of a work piece to be chucked thereto, said projecting means having an arcuate contour on at least one face thereof and means connected to said plate and mounted for reciprocation in said support to cause said plate to be flexed, said projecting means being arranged to have their arcuately contoured faces mutually engage a work piece and confine it to said plate.

3. A work holder comprising a support, means bearing in said support for reciprocation relative thereto, a flexible diaphragm separate from said support connected to said means outwardly of said support, means for maintaining a uniform spacing between the peripheral portions of said diaphragm and said support, work receiving elements on the face of said diaphragm remote from said support, said reciprocable means being operable in one direction to flex said diaphragm on application of a work piece to said elements to cause said elements to fix the work piece to the diaphragm until the diaphragm is returned to its normal position by opposite movement of said reciprocable means.

4. Chucking apparatus including a support, a resilient diaphragm generally parallel to one face of and separate from said support, spacer means between the periphery of said diaphragm and said support, lugs projecting from the face of said diaphragm away from said support normally disposed at substantially right angles thereto and means for moving said diaphragm to said support, thereby flexing said diaphragm to cause said lugs to incline and become operative to fix a work piece thereto.

5. Work holder apparatus including a support, a flexible resilient plate-like element mounted generally parallel to one face of and separate from said support and having limit elements projecting to said support at its periphery, generally circularly spaced lugs projecting from said plate-like element away from said support having arcuate contours at their inner faces in a sense longitudinally thereof, and draw bar means bearing in said support operable to flex the center of said plate-like element to dispose said lugs to smoothly center and fix a work piece to said plate-like element.

6. Chucking apparatus including a support, a resilient diaphragm generally parallel to and separate from said support, a draw bar bearing in said support connected to said diaphragm, spherical elements projected from the periphery of said diaphragm adapted to bear on said support, lugs projecting from the face of said diaphragm away from said support, seal elements confining said spherical elements, said seal elements being of a resilient character, said draw bar being operable to flex said diaphragm inwardly to said support to cause said lugs to mutually converge and fix a work piece to said diaphragm.

7. A work holder comprising a resilient flexible plate for receiving a work piece, means projected from one face of said plate having a convex contour arranged to define a perihperal surface of the work piece and means for producing a non-planar contour in said one face of said plate in the area of said projecting means to cause them to incline, engage and center the work piece by means of said convex contour thereof, said last named means including a mount in limited supporting relation to the other face of said flexible plate.

8. A work holder comprising resilient means for receiving a work piece, means projecting relative one face of said resilient means having oppositely convex surfaces to selectively define inner and outer peripheral surfaces of work pieces, means in limiting supporting relation to a face of said resilient means, and means connected to said resilient means operable to cause selective deformation thereof to condition said projecting means to selectively clamp a work piece by engagement of an inner or an outer peripheral surface.

9. Chuck apparatus including a support, a flexible diaphragm separate from said support having lug elements projected from one face remote from the support, said lug elements having oppositely arranged arcuately contoured surfaces, bracket means on said support confining the outer peripheral edge of said diaphragm limiting its movement from said support, means connected adjacent the periphery of said diaphragm limiting its movement inward of said support and means connected centrally of the diaphragm operable to selectively flex said diaphragm in the area of said lug elements to cause them to fix a work piece in centered relation to said diaphragm.

10. Chuck apparatus including a support, draw bar means bearing in and reciprocable in said support, a resilient plate-like member separate from said support mounted to said draw bar means spaced outwardly from said support, work engaging means spaced about and projecting from the face of said plate-like member remote from said support and means for limiting the movement of said plate-like member relative to said support whereby on movement of said draw bar means said limit means will provide a flexing of said plate-like member to induce a firm engagement of a work piece by said work engaging means.

11. Chuck apparatus including a support, draw bar means bearing in said support and projected from one face thereof, a resilient diaphragm separate from said support fixed to said draw bar generally parallel to said one face of said support, spherical elements projected from and about the periphery of said diaphragm in the direction of said one face of said support for engagement thereof on movement of said draw bar inwardly of said support whereby to produce a smooth concavity in said diaphragm which is uniform and relatively stress free, and chuck jaws on said resilient diaphragm.

References Cited in the file of this patent

UNITED STATES PATENTS

| | | |
|---|---|---|
| 1,812,455 | Stowell | June 30, 1931 |
| 2,389,366 | Jones | Nov. 20, 1945 |
| 2,538,289 | Arms | Jan. 16, 1951 |
| 2,582,680 | Church | Jan. 15, 1952 |